(12) United States Patent
Herrschaft

(10) Patent No.: US 12,145,257 B2
(45) Date of Patent: *Nov. 19, 2024

(54) APPARATUSES AND SYSTEMS FOR THE AUTOMATED RETRIEVAL AND TRANSPORT OF ARTICLES

(71) Applicant: McKesson Corporation, Irving, TX (US)

(72) Inventor: Rich Herrschaft, West Chester, PA (US)

(73) Assignee: McKesson Corporation, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,980

(22) Filed: Jan. 31, 2023

(65) Prior Publication Data
US 2023/0166409 A1   Jun. 1, 2023

Related U.S. Application Data

(63) Continuation of application No. 16/831,998, filed on Mar. 27, 2020, now Pat. No. 11,590,666.

(51) Int. Cl.
| | |
|---|---|
| *B25J 15/02* | (2006.01) |
| *B25J 9/02* | (2006.01) |
| *B25J 9/16* | (2006.01) |
| *B25J 15/00* | (2006.01) |
| *B25J 19/02* | (2006.01) |

(Continued)

(52) U.S. Cl.
CPC .......... *B25J 15/0293* (2013.01); *B25J 9/026* (2013.01); *B25J 9/1612* (2013.01); *B25J 9/1633* (2013.01); *B25J 9/1674* (2013.01); *B25J 15/0038* (2013.01); *B25J 15/0042* (2013.01); *B25J 15/026* (2013.01); *B25J 19/021* (2013.01); *B65G 1/0464* (2013.01); *B65G 1/137* (2013.01)

(58) Field of Classification Search
CPC ...... B25J 15/0293; B25J 9/026; B25J 9/1612; B25J 9/1633; B25J 9/1674; B25J 15/0038; B25J 15/0042; B25J 15/026; B25J 19/021; B65G 1/0464; B65G 1/137; G05B 2219/40293
See application file for complete search history.

(56) References Cited

U.S. PATENT DOCUMENTS

| | | | | |
|---|---|---|---|---|
| 5,558,200 A | * | 9/1996 | Whitby | ................ B65G 47/846 198/470.1 |
| 6,264,419 B1 | * | 7/2001 | Schinzel | .................. B25J 9/023 414/751.1 |

(Continued)

*Primary Examiner* — Thomas Randazzo
(74) *Attorney, Agent, or Firm* — Ballard Spahr LLP

(57) ABSTRACT

A method and apparatus for dispensing and retrieving products is provided. A system may include: a grasping head; first and second grasping members, each grasping member comprising: a top member; a post member; and first and second grasping fingers, where the first and second grasping fingers extend from the post member and are spaced apart from the top member by a predetermined distance, where the first and second grasping members are connected to the grasping head, where at least one of the first and second grasping members is movably connected to the grasping head, where the at least one of the first and second grasping members is movable relative to the other of the first and second grasping members.

20 Claims, 13 Drawing Sheets

(51) Int. Cl.
*B65G 1/04* (2006.01)
*B65G 1/137* (2006.01)

(56) References Cited

U.S. PATENT DOCUMENTS

| | | | | |
|---|---|---|---|---|
| 6,523,874 | B1* | 2/2003 | Edmeyer | B65B 21/18 |
| | | | | 53/247 |
| 7,325,667 | B1* | 2/2008 | Damick | B65G 59/02 |
| | | | | 198/395 |
| 8,956,568 | B2* | 2/2015 | Ohiso | G01N 35/0099 |
| | | | | 422/63 |
| 11,590,666 | B1* | 2/2023 | Herrschaft | B25J 15/026 |
| 2013/0136569 | A1* | 5/2013 | Rosmarin | G01N 35/0099 |
| | | | | 414/800 |
| 2014/0311090 | A1* | 10/2014 | Weber | G01N 35/0099 |
| | | | | 53/381.4 |
| 2015/0298321 | A1* | 10/2015 | Gross | B65G 11/023 |
| | | | | 422/67 |
| 2018/0297193 | A1* | 10/2018 | Garfield | B25J 9/026 |
| 2018/0354765 | A1* | 12/2018 | Schoenfelder | B67B 3/2066 |
| 2019/0250180 | A1* | 8/2019 | Pollack | B25J 9/041 |

* cited by examiner

APPARATUSES AND SYSTEMS FOR THE AUTOMATED RETRIEVAL AND TRANSPORT OF ARTICLES

CROSS-REFERENCE TO RELATED PATENT APPLICATION

This application is a continuation of U.S. Non-Provisional application Ser. No. 16/831,998, filed on Mar. 27, 2020, which is incorporated by reference in its entirety herein.

TECHNOLOGICAL FIELD

Embodiments of the present invention relate generally to automated retrieval and transport of articles, and in particular, to an apparatus configured to grasp articles and maintain orientation of articles while transporting articles within a dispensing system.

BACKGROUND

The dispensing of goods is a common practice that can often be time consuming and prone to error, particularly when performed manually. The automation of dispensing can improve both efficiency and accuracy of the dispensing operation; however, different types of articles necessarily require different types of dispensing. Further, automated dispensing can be costly, and if the dispensing operations are not frequent enough, or there is a low-risk associated with errors, the cost of automation may not be justified.

Automated dispensing may conventionally occupy a substantial footprint, particularly when there are many types of products to be dispensed. Products may be arranged in a manner that is less efficient for storage, but more conducive to an automated dispensing operation, which may substantially increase the floor space required for automated dispensing, thereby increasing the effective cost while decreasing the efficiency. Therefore it may be desirable to implement apparatuses, systems, and methods which may facilitate automated retrieval and dispensing in a relatively compact form factor to provide efficiency improvements and for flexibility in installation.

SUMMARY

Embodiments of the present disclosure may provide a method, apparatus, and system for retrieving and dispensing articles. An example system includes: a grasping head; first and second grasping members, each grasping member comprising: a top member; a post member; and first and second grasping fingers, where the first and second grasping fingers extend from the post member and are spaced apart from the top member by a predetermined distance, where the first and second grasping members are connected to the grasping head, where at least one of the first and second grasping members is movably connected to the grasping head, where the at least one of the first and second grasping members is movable relative to the other of the first and second grasping members. The system may include a linear actuator connecting the at least one of the first and second grasping members to the grasping head, where the linear actuator moves the at least one of the first and second grasping members relative to the other of the first and second grasping members between an open position and a closed, engaged position.

According to an example embodiment, the first and second grasping members are configured to receive between the first and second grasping fingers, a container, where in the open position, the container is not grasped by the grasping members, and where in the closed, engaged position, the container is grasped by the grasping members. The container may include a cap, where the predetermined distance between the first and second grasping fingers and the top member of each grasping member is established based on a size of cap to be received within the predetermined distance. Embodiments may include a controller, where the controller controls movement of the at least one of the first and second grasping members relative to the other of the first and second grasping members, where the first and second grasping members are configured to be moved between an open position and a closed, engaged position, where in the engaged position, the first and second grasping members are configured to secure a container therebetween.

Force feedback may be received at the controller from the at least one of the first and second grasping members, where in response to the at least one of the first and second grasping members moving from the open position to the closed, engaged position, the at least one of the first and second grasping members is stopped in response to receiving a force satisfying a predetermined value. The system of some embodiments may include a controller where the controller is configured to identify a location of a container to be retrieved by the grasping head and advance the grasping head to the location.

Embodiments provided herein may include a method including: positioning first and second grasping members on opposing sides of a container, where the first and second grasping members each include a post member and first and second grasping fingers, where the first and second grasping fingers extend in a V-shape from the respective post member; advancing the first and second grasping members toward one another capturing the container between the first and second grasping fingers of each of the first and second grasping members; and stopping advancement of the first and second grasping members in an engaged position in response to a force exerted by the container on the first and second grasping members satisfying a predetermined value.

Methods may include: identifying a container size based on a distance between the first and second grasping members; determining if the container size corresponds to an anticipated container size; and providing an alert in response to the container size not corresponding to the anticipated container size. The first and second grasping fingers of each of the first and second grasping members extend from the respective post member at an angle of between about 80 degrees and 120 degrees. The first and second grasping fingers of each of the first and second grasping members extend from the respective post member at an angle of between about 95 degrees and 105 degrees.

According to an example embodiment, methods may include: identifying a location of the container at a controller in response to a request; and advancing a grasping head including the first and second grasping members to the location of the container. Advancing the grasping head to the location of the container may be performed by a robotic arm. Advancing the first and second grasping members toward one another may be performed by the grasping head. Advancing the first and second grasping members toward one another may be performed by a linear actuator of the grasping head. Methods may include retrieving the container from the location of the container; advancing the container to a second location; and releasing the container at the second location. Releasing the container at the second location may include advancing the first and second grasping members away from one another.

Embodiments provided herein may include a grasping member including: first and second grasping fingers; a top member, where the top member is spaced from the grasping fingers by a predetermined distance; and a post element extending between the first and second grasping fingers and the top member, where the first and second grasping fingers extend from the post member at an angle of between about 80 degrees and 120 degrees relative to one another, where a radius is defined between the first and second grasping fingers having a radius dimension of between about a quarter-of-an-inch and three-quarters-of-an-inch. The predetermined distance may be established based on a height dimension of a cap of a container to be grasped by the grasping member. The first and second grasping fingers may extend from the post member having an angle between them of about 95 and 105 degrees relative to one another.

DESCRIPTION OF THE DRAWINGS

Reference now will be made to the accompanying drawings, which are not necessarily drawn to scale, and wherein.

DETAILED DESCRIPTION

Embodiments of the present disclosure may provide various apparatuses and systems for improving the efficiency with which articles are retrieved, transported, and dispensed. Some embodiments and components of the present invention will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements.

Example embodiments of the present disclosure may provide an apparatus and system to facilitate the automated retrieval and dispensing of articles, which may be used in a wide variety of applications ranging from industrial manufacturing to precision part procurement to retail distribution. Embodiments may be used in dispensary settings where articles are stored and staged for automated retrieval followed by automated dispensing and/or transport to other areas of a system. Embodiments described herein overcome various challenges of automated retrieval and dispensing, and do so in a compact form factor that may be accessed and maintained efficiently.

Automated retrieval, transport, and dispensing as described herein may improve efficiency and accuracy of dispensing of articles incorporating mechanisms that may solve issues identified by the applicant as substantial hurdles in automating the retrieval and transport of articles, particularly when the articles are of non-uniform sizes. As noted above, systems for automated retrieval, transport, and dispensing may be useful in a wide variety of implementations ranging from industrial applications to retail applications. While systems may be configured to retrieve and transport a wide variety of article form factors, example embodiments described herein focus on a specific form factors including vials and bottles, specifically vials and bottles adapted to contain medications. The vials generally relate to cylindrical tubular containers with an opening to the vial of the same diameter as an inner-diameter of the body of the vial. While bottles are also generally cylindrical, bottles as described herein include a shoulder proximate the top and a bottle opening that is of a smaller diameter than an inner-diameter of the body of the bottle. Both vials and bottles are referred to herein as containers, where containers is interpreted to mean vials and/or bottles. However, containers may come in a variety of sizes, and container caps may be of various configurations. Embodiments described herein are configured to grasp and retrieve for transport a wide variety of container sizes having numerous container cap configurations and sizes.

Figure 1:
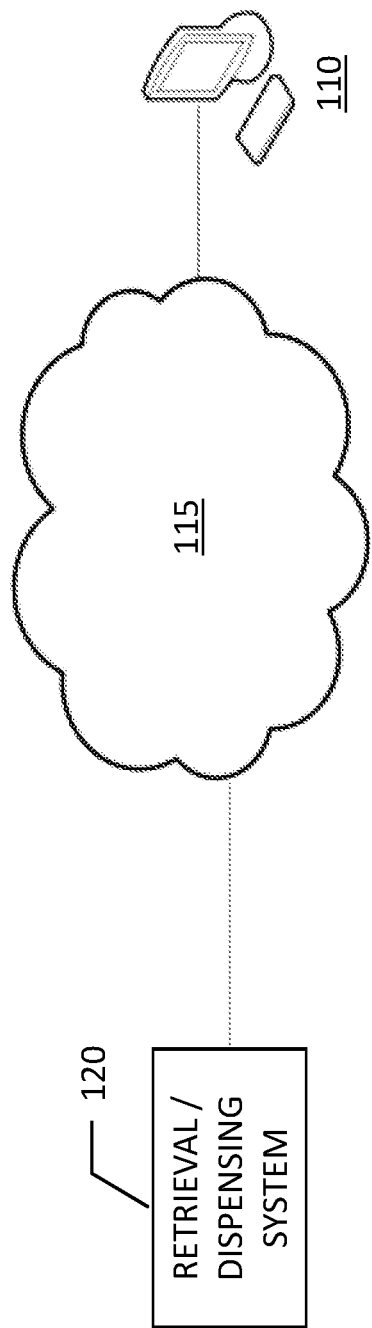
FIG. 1 illustrates a schematic of an automated retrieval and dispensing system in communication with a user station via a network according to an example embodiment of the present disclosure.

FIG. 1 depicts a system that can be used in conjunction with various embodiments of the present disclosure. As shown in FIG. 1, an example embodiment of the system may include an automated retrieval/dispensing system 120 and one or more networks 115. Embodiments may include various other devices which may be in communication with the one or more networks 115, such as a user station 110 which may be used for providing manual commands or performing manual review and/or audit of an automated process performed by the automated retrieval/dispensing system 120, for example. Embodiments may further include other network entities from which data may be received from or transmitted to, as will be described further below. Each of the components of the system may be in electronic communication with, for example, one another over the same or different wireless or wired networks (e.g., network 115) including, for example, a wired or wireless Personal Area Network (PAN), Local Area Network (LAN), Metropolitan Area Network (MAN), Wide Area Network (WAN), or the like. Additionally, while FIG. 1 illustrates the system entities as separate, standalone entities, the various embodiments are not limited to this particular architecture.

Figure 2:
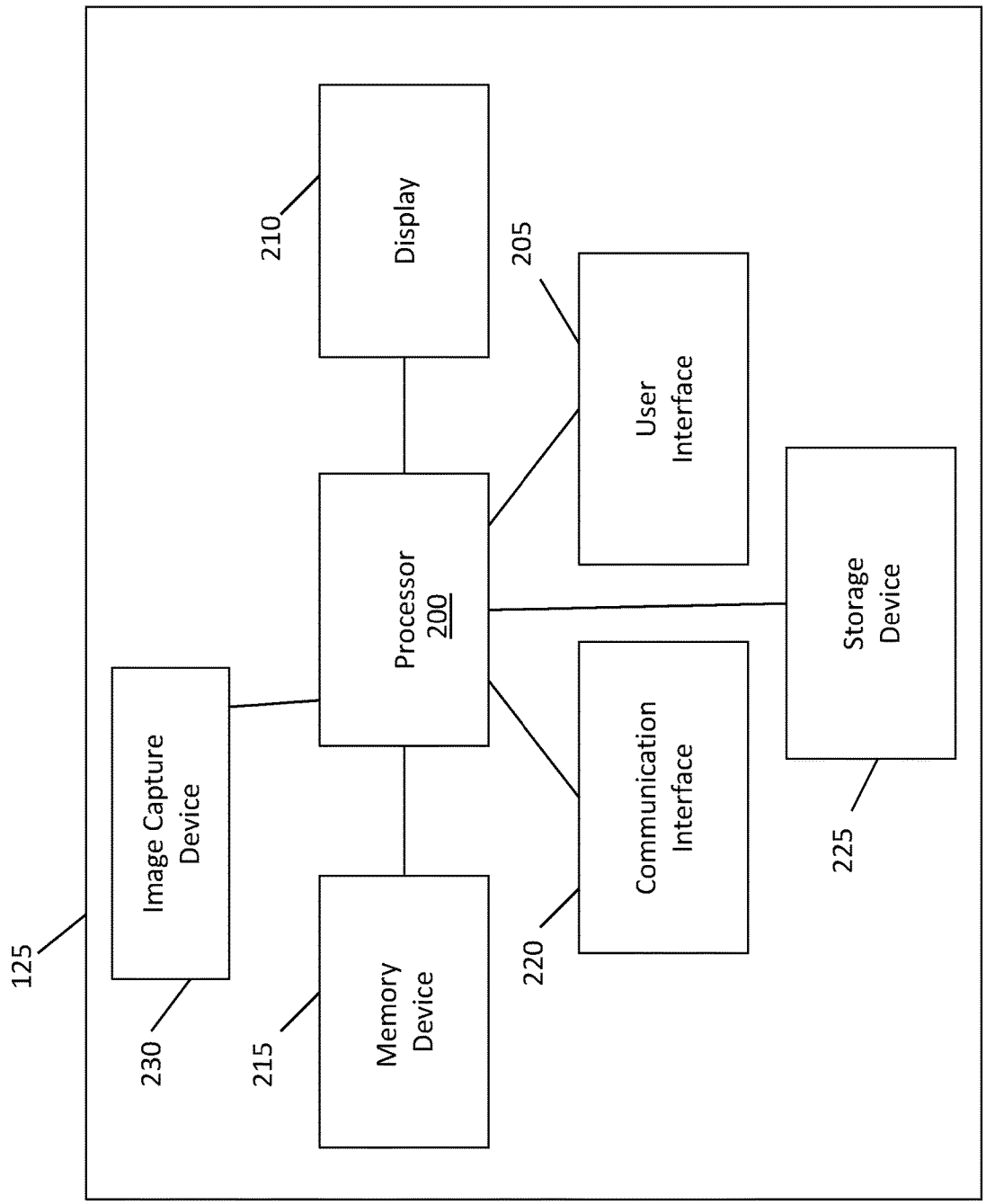
FIG. 2 illustrates a schematic of a controller for controlling an automated retrieval and dispensing system according to an example embodiment of the present disclosure.

Example embodiments of the automated retrieval and dispensing system 120 as described herein may include a controller configured to control or otherwise facilitate the activities performed at the automated retrieval and dispensing system. FIG. 2 provides a schematic of an example embodiment of a controller 125 of an automated retrieval and dispensing system. In general, the term "controller" may refer to, for example, any computer, computing device, desktop, tablet, notebook, laptop, distributed system, server, processing device, or combination of processing devices adapted to perform the functions described herein.

In an example embodiment in which the automated retrieval/dispensing system 120 is used for retrieval, transport, and dispensing of medications, the controller 125 may include, be associated with, or be in communication with a variety of computing entities, such as pharmacy inventory management systems, a medication identification database, data storage/facilitation computing entities, or other devices that may interface with inventory management, dispensing, replenishing, etc. While example embodiments of automated dispensing systems may be implemented in virtually any setting which may benefit from automated dispensing of articles, embodiments described herein will be described generally with respect to the field of healthcare in which medications may be dispensed for patients or caregivers, such as medications packaged in "unit of use" packages. However, it is appreciated that embodiments of the present invention may apply to various other embodiments of automated dispensing systems and devices.

As will be understood from FIG. 2, in one embodiment, the controller 125 may include a processor 200 that communicates with other elements of the controller 125 via a system interface or bus. The processor 200 may be embodied in a number of different ways. For example, the processor 200 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an example embodiment, the processor 200 may be configured to execute instructions stored in memory or otherwise accessible to the processor 200. As such, whether configured by hardware or software methods, or by a combination thereof, the processor 200 may represent an entity capable of performing operations according to embodiments of the present invention when configured accordingly. For example, as discussed in more detail below, the controller 125 may be configured to, among other things, facilitate accurate identification of unit of use packages of medication. A user interface 205 may be configured for user input to initiate the automated retrieval/dispensing process or to confirm, advance, or otherwise interact with operations of the automated retrieval and dispensing process. The user interface 205 may include a keyboard, a pointing device, or other mechanism for a user to communicate with the processor 200 and interact with the controller 125.

A controller according to example embodiments may further include a display 210 which may be configured to present information to a user pertaining to the automated retrieval/dispensing process and to communicate alerts or confirm success of various steps of the automated retrieval/dispensing/labeling process. The display 210 may also be configured to present information to a user pertaining to the status of the automated retrieval/dispensing system, information regarding inventory, or any information which may be useful to a user of the device. The display 210 may include a touch screen display which may partially or fully comprise the user interface 205. As noted above, example embodiments may include a system that also incorporates the approval station. In such an embodiment, the user interface 205 and display 210 may be used for the approval of operations of the retrieval and dispensing process, auditing the automated retrieval/dispensing/labeling process, or reviewing alerts from the system.

The controller 125 may further include or be in communication with an image capture device 230. The image capture device may include a still camera, a video camera, a one or two-dimensional barcode reader, and/or the like. The image capture device 230 of embodiments of the present invention may be used to capture images and/or video of a unit of use package once it is retrieved and/or dispensed from a system as described herein. The user interface 205, as with any of the components of the controller 125, may be located remotely from the controller 125 and may be accessed via a wired or wireless network.

The controller 125 may further include transitory and non-transitory memory device 215, which may include both random access memory (RAM) and read only memory (ROM). The ROM may be used to store a basic input/output system (BIOS) containing the basic routines that help to transfer information to the different elements within the controller 125.

In addition, in one embodiment, the controller 125 may include or be in communication with at least one storage device 225, such as a hard disk drive, a CD drive, and/or an optical disk drive for storing information on various computer-readable media. The storage device(s) 225 and its associated computer-readable media may provide non-volatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. The storage device may be configured to store, for example, a list of orders to be retrieved, dispensed, and labeled and/or an audit trail of unit of use packages retrieved, dispensed, and labeled from received orders.

Furthermore, a number of executable instructions, applications, scripts, program modules, and/or the like may be stored by the various storage devices 225 and/or within memory device 215. As discussed in more detail below, these executable instructions, applications, program modules, and/or the like may control certain aspects of the operation of the controller 125 with the assistance of the processor 200 and operating system, although their functionality need not be modularized. In addition to the program modules, the controller 125 may store or be in communication with one or more databases.

Also located within the controller 125, in one embodiment, is a communication interface 220 for interfacing with various computing entities. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. The controller 125 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

Figure 3:
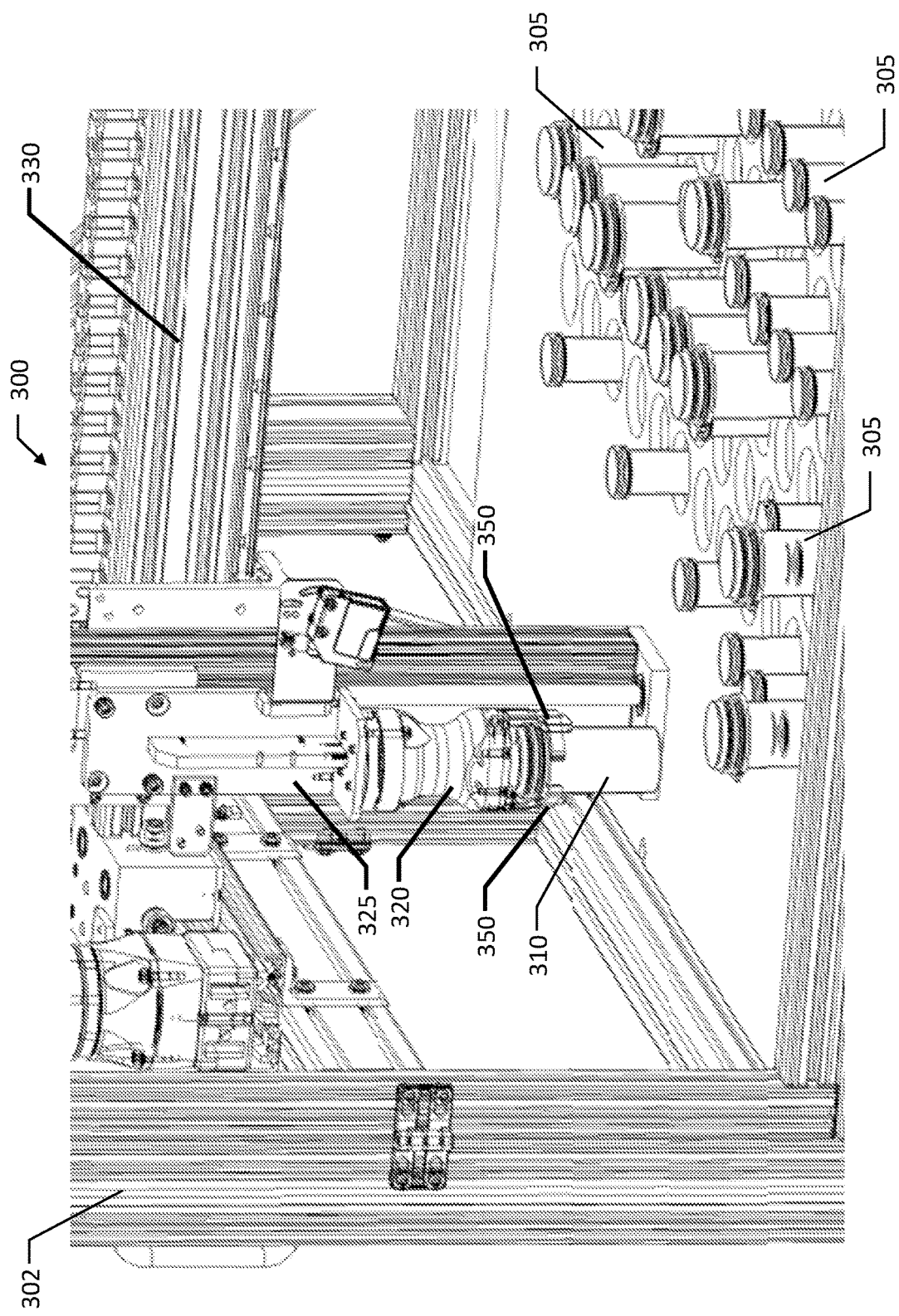
FIG. 3 illustrates an automated retrieval and dispensing system according to an example embodiment of the present disclosure.

In an example embodiment described herein, an automated retrieval and dispensing system may be used to retrieve, transport, and dispense unit of use packaged products in a variety of environments, such as in a high-volume dispensary for distribution throughout a region. FIG. 3 illustrates an example embodiment of a retrieval and dispensing system 300 which may be configured to automatically retrieve and dispense unit of use packages of medication in response to receiving a prescription order. Automated dispensing systems 300 which may benefit from example embodiments of the present disclosure may be configured to dispense containers 305 of varying sizes with various cap sizes and configurations as shown. According to the embodiment of FIG. 3, a container 310 may be grasped by grasping members 350, which are attached to a grasping head 320. The grasping head 320 may extend from a robotic arm 325, where the robotic arm 325 is connected to a mechanism for moving the robotic arm 325 within the system 300. The robotic arm 325 of the illustrated embodiment is moved through the system by an X-Y robotic frame 330 that enables the robotic arm 325 to be positioned anywhere within a transport envelope of the robotic frame 330.

Figure 4:
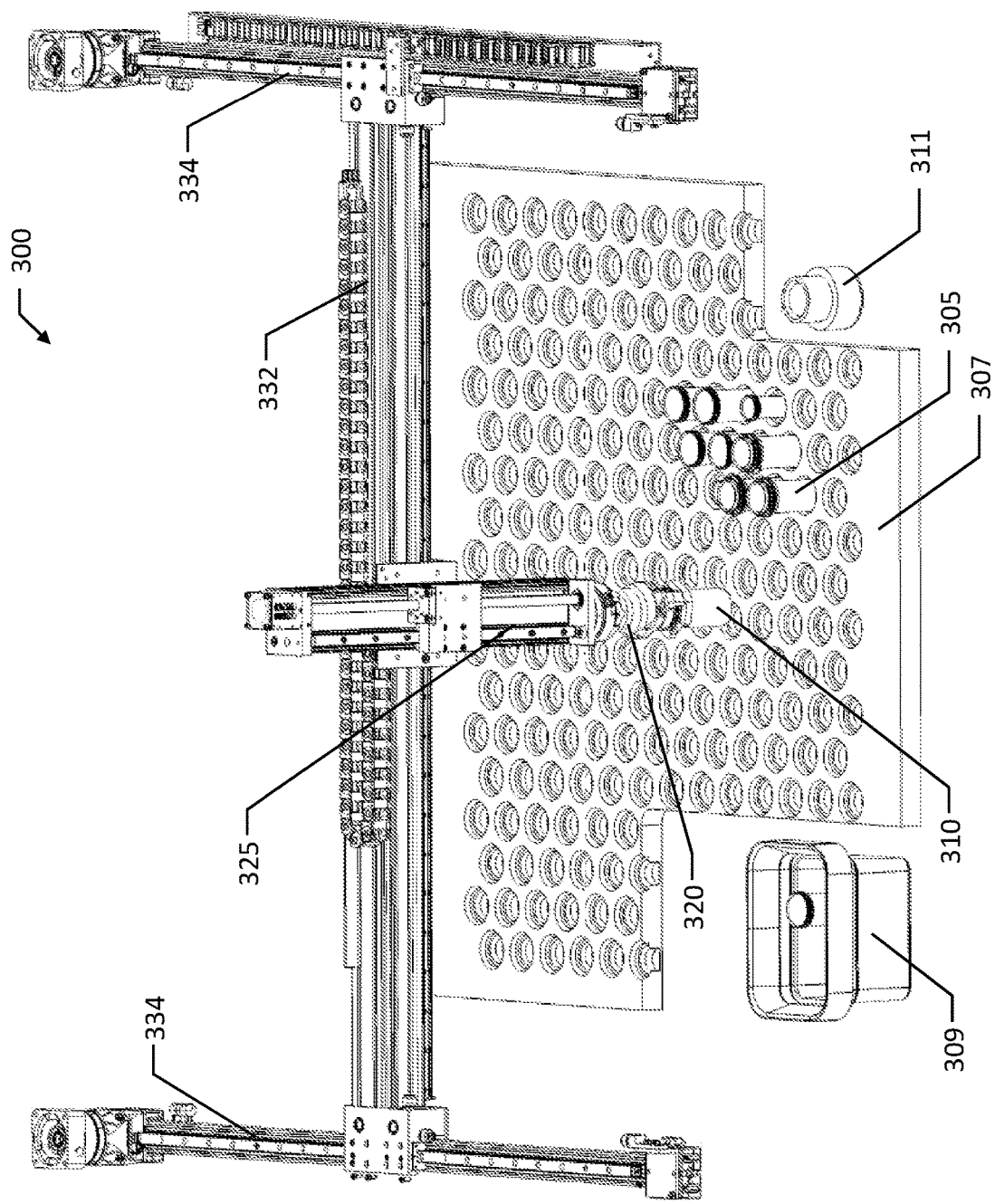
FIG. 4 illustrates an automated retrieval and dispensing system according to another example embodiment of the present disclosure.

FIG. 4 illustrates an example embodiment of the system 300 without the enclosure 302 of FIG. 3 for ease of illustration. As shown, the containers 305 are received within a table 307 having a plurality of container storage locations configured to accommodate containers of various sizes. The robotic arm 325 is attached to an X-Y robotic frame including a transverse member 332 and longitudinal members 334. The robotic head is able to move along a length of the transverse member 332, while the transverse member travels along a length of the longitudinal members 334. This provides overhead access for the robotic arm 325 over an envelope of the system that includes the table 307 and may include stations such as bin station 309 and puck station where a container puck 311 is disposed. The robotic arm 325 is configured to move in a plane orthogonal to the X-Y robot motion, in a Z-axis direction toward and away from the table 307. This movement advances the grasping head 320 toward and away from the containers 305 of the table 307.

Figure 5:
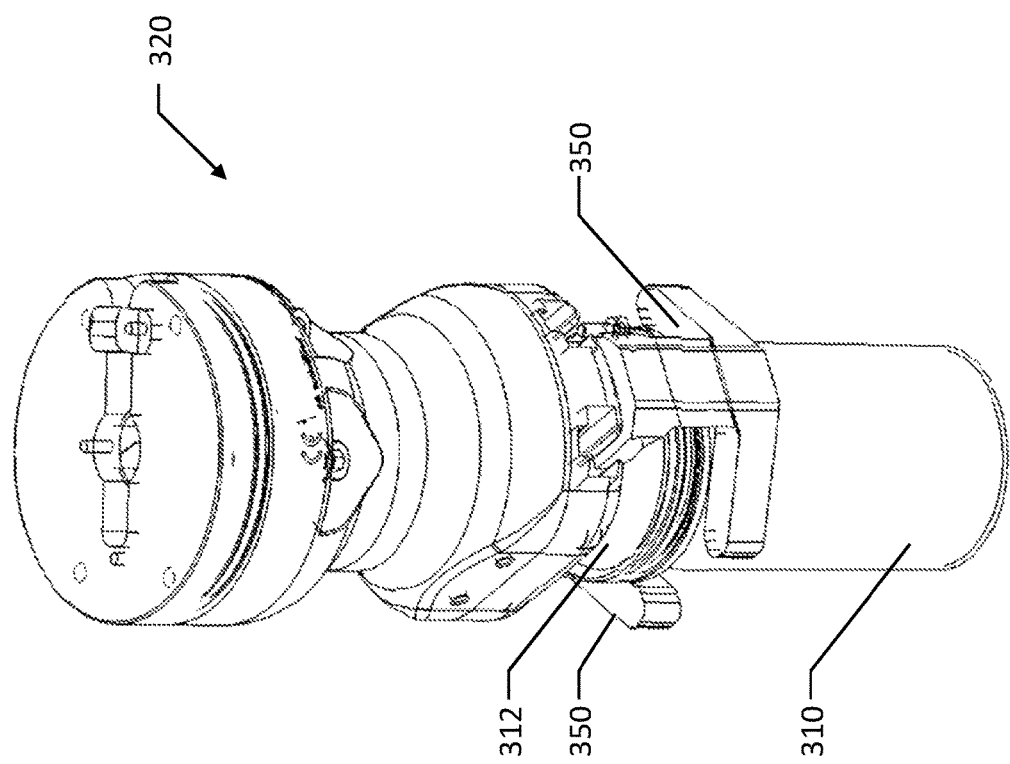
FIG. 5 illustrates a grasping head and grasping members of an automated retrieval and dispensing system according to an example embodiment of the present disclosure.

The grasping head 320 is vertically deployable to grasp and retrieve containers to transport them for dispensing or movement to other operations. FIG. 5 illustrates an example embodiment of a grasping head 320 with grasping members 350. The grasping members 350 are moved toward and away from one another by the grasping head 320. In doing so, the grasping head 320 may move the grasping members 350 away from one another to open a receiving area between the grasping members, whereby a container may be received. In an open configuration, where the grasping head 320 has moved the grasping members 350 apart to an open position, the robotic arm 325 may advance the grasping head toward a container 310, which may include a cap 312. Once the robotic arm 325 has positioned the grasping members 350 on either side of the container 310, the grasping head 320 may advance the grasping members toward one another to an engaged position, where in the engaged position the container 310 is securely held between the grasping members 350.

Figure 6:
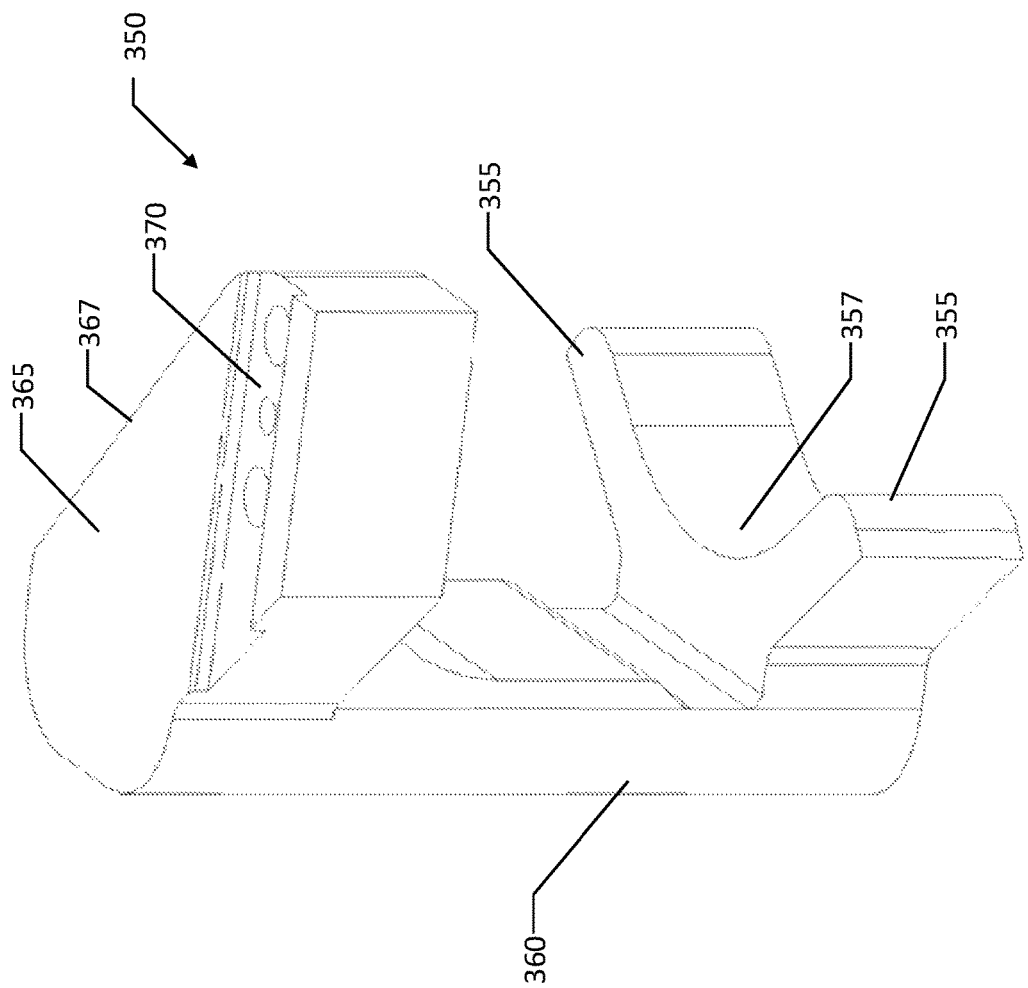
FIG. 6 illustrates a grasping member according to an example embodiment of the present disclosure.

An example embodiment of a grasping member 350 is shown in FIG. 6, including grasping fingers 355 extending from post 360, where the grasping fingers are arranged at an angle of between about 80-degrees and 120-degrees from one another, and more preferably between about 95-degrees and 105-degrees. Further, the grasping fingers 355 are connected by a radiused portion 357, which may have a radius of between about a quarter-inch and an inch. The post 360 is connected to top member 365, where the top member is separated from the grasping fingers 355 by a predetermined height. The top member 365 may include a channel 370.

The height between the grasping fingers 355 and a bottom surface of the top member 365 may be configured according to a height of the tallest container cap anticipated to be used by containers to be grasped by embodiments described herein. Referring back to FIG. 5, the clearance height between the grasping fingers 355 of the grasping members 350 and the bottom of the top member 365 of the grasping members enables the cap 312 to be received between the grasping fingers of the grasping members and the top members.

Figure 7:
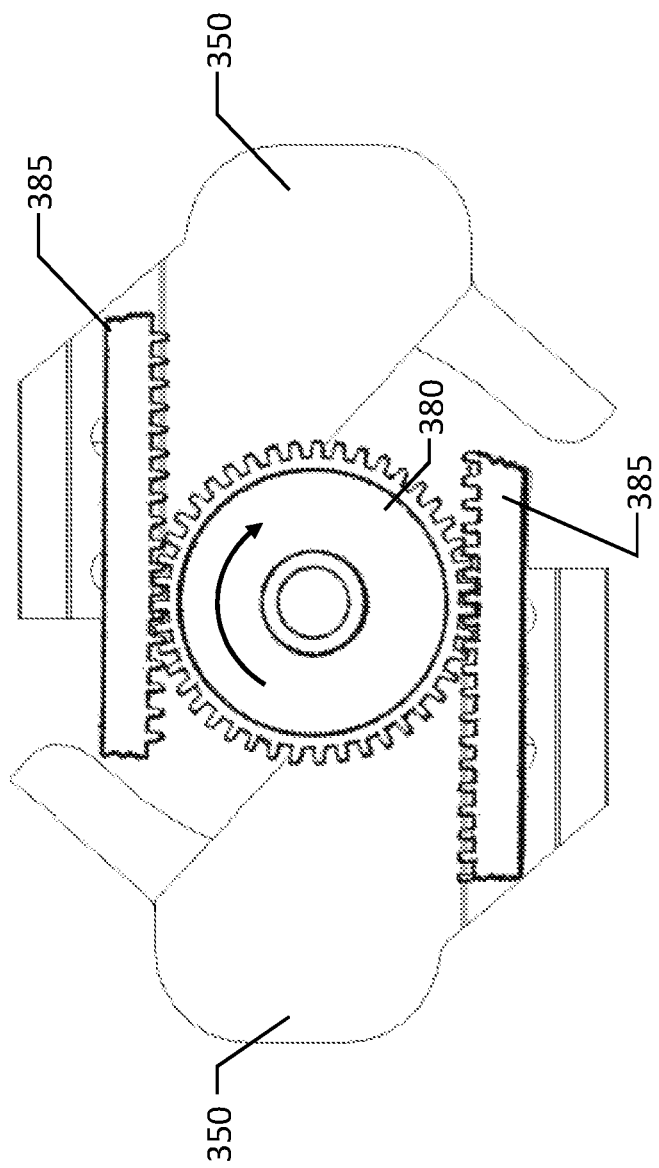
FIG. 7 depicts a mechanism for moving grasping members relative to one another according to an example embodiment of the present disclosure.

The top member 365 of the illustrated embodiment of FIG. 6 includes an angled surface 367. A pair of grasping member 350 may have opposing angled surfaces 367 that may be configured to "nest" together when the grasping members are drawn together as close as possible for grasping the smallest container possible with the grasping members. The grasping members 350 may be moved toward and away from one another using grasping head 320. The mechanism by which the grasping members 350 may be advanced toward and away from one another may be any of a variety of mechanisms. For example, one or both grasping members 350 may include a gear rack within channel 370, and a pinion engaging the rack gear. Turning of the pinion gear may advance the grasping members toward and away from one another. FIG. 7 illustrates such an example of a pinion gear 380 and two opposing racks 385. In response to the pinion gear 380 turning clockwise, the racks 385 and attached grasping members 350 are drawn together, whereas in response to the pinion gear 380 turning counter-clockwise, the grasping members 350 are moved apart.

Figure 8:
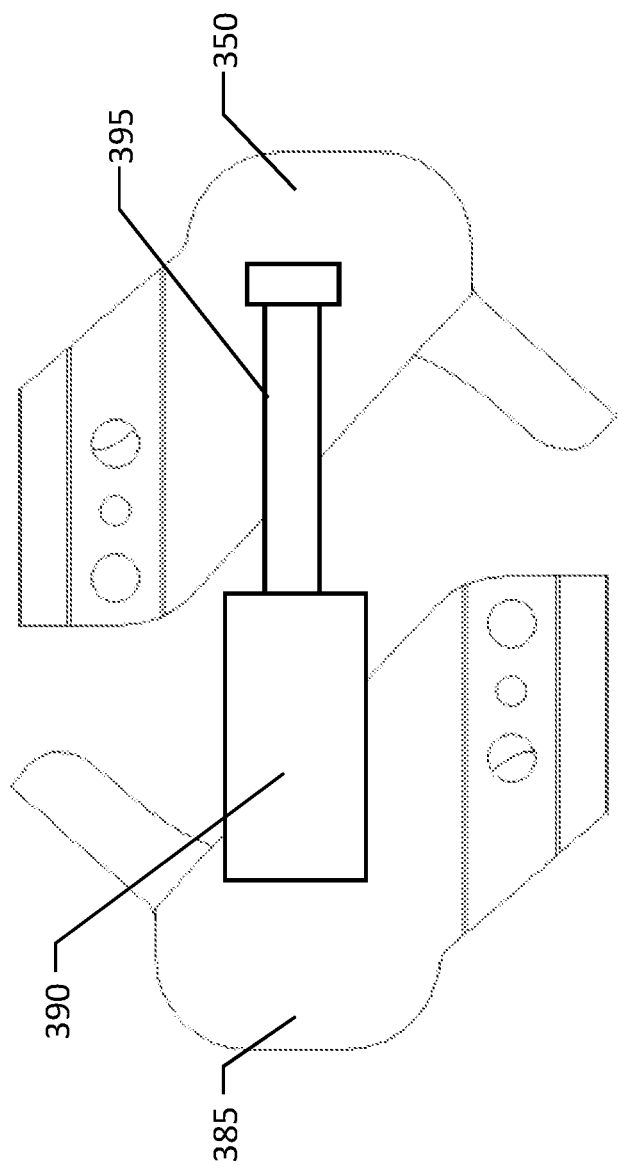
FIG. 8 depicts another mechanism for moving grasping members relative to one another according to an example embodiment of the present disclosure.

Another mechanism for advancing the grasping members 350 toward and away from one another is illustrated in FIG. 8 which depicts an actuator 390 with rod/piston 395. The actuator can be hydraulic, pneumatic, electro-mechanical (e.g., servo-motor driven, solenoid, etc.) or the like. The actuator 390 can draw the grasping members 350 together or drive them apart as necessary.

Figure 9:
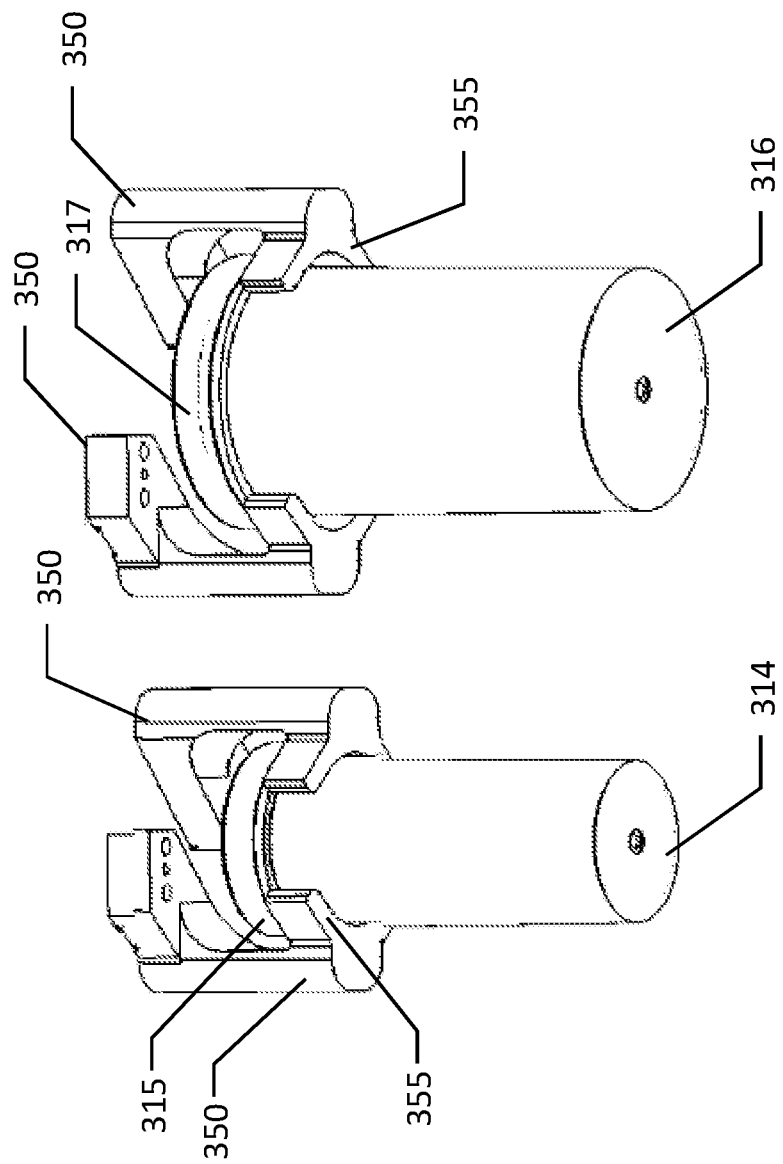
FIG. 9 illustrates grasping members engaged with different sizes of containers according to an example embodiment of the present disclosure.

FIG. 9 illustrates an example embodiment of the grasping members 350 described herein engaged with containers 314 and 316 of differing sizes. The grasping members 350 are illustrated without the grasping head 320 or robotic arm 325 for ease of illustration. As shown, the grasping members are configured to advance from an open position to the engaged position shown in FIG. 9, whereby the containers 314 and 316 are firmly grasped by the grasping members 350. The grasping fingers 355 engage the containers beneath a lip or collar disposed proximate the top of the container, under the lid. The lid or caps 315, 317 of the respective containers 314, 316 is received within the space between the grasping fingers 355 and the top members 365 of each grasping member. The space between the grasping fingers 355 and the top members 365 is sized to fit the tallest caps or lids anticipated to be used in the system for which the grasping members are designed.

Figure 10:
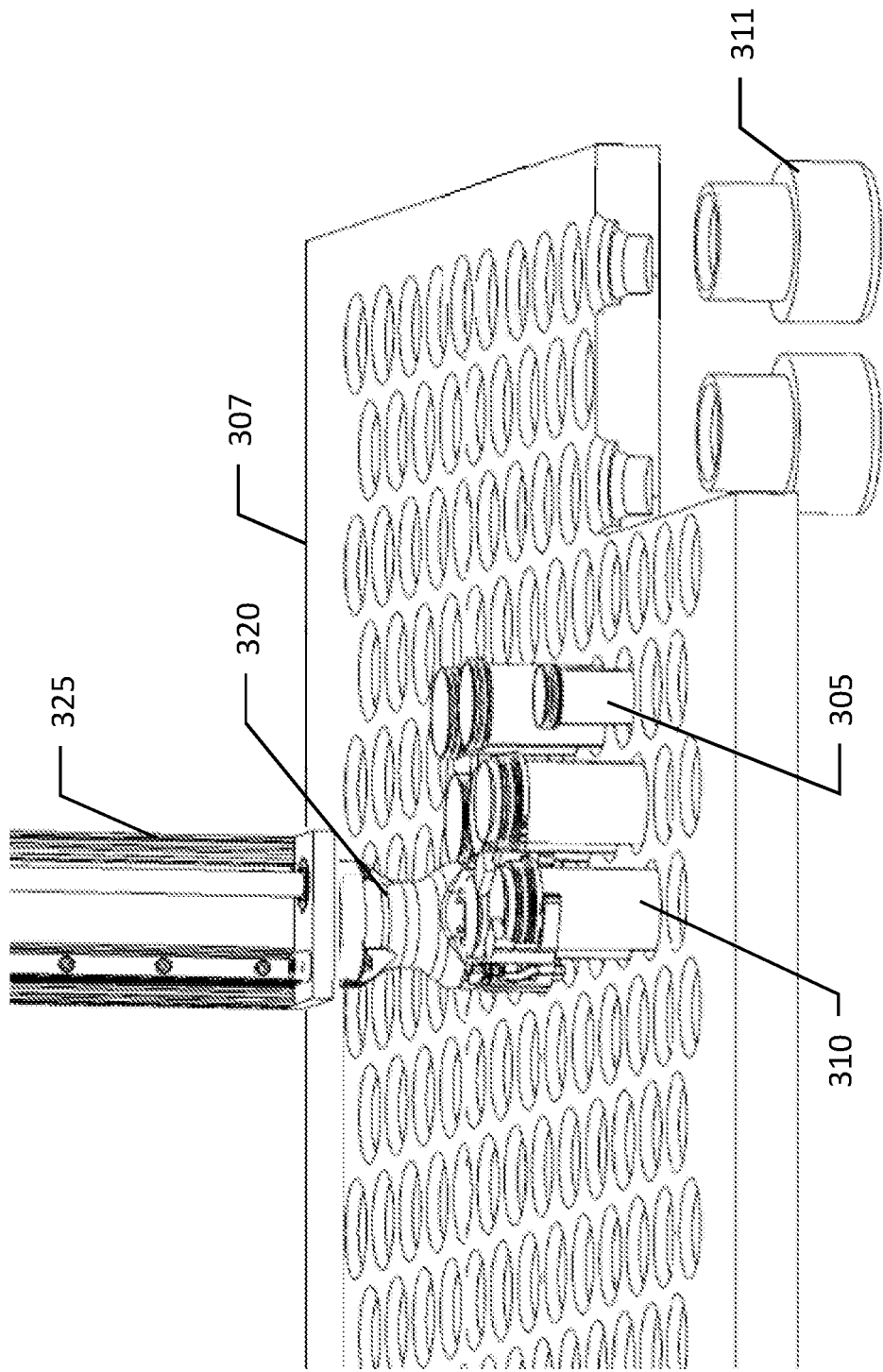
FIG. 10 illustrates an automated retrieval and dispensing system grasping a container from a table according to an example embodiment of the present disclosure.
Figure 11:
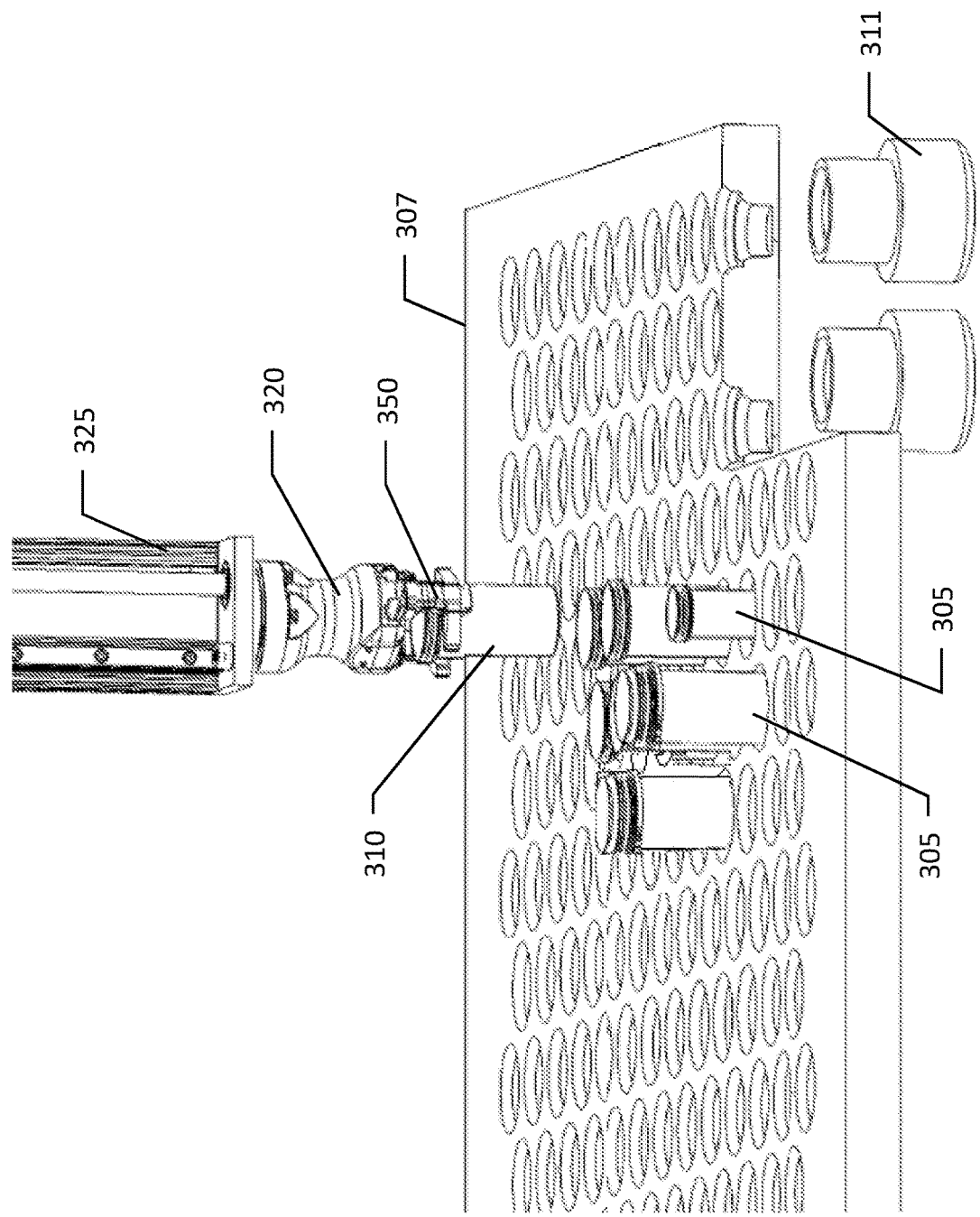
FIG. 11 illustrates an automated retrieval and dispensing system transporting a container from a table according to an example embodiment of the present disclosure.
Figure 12:
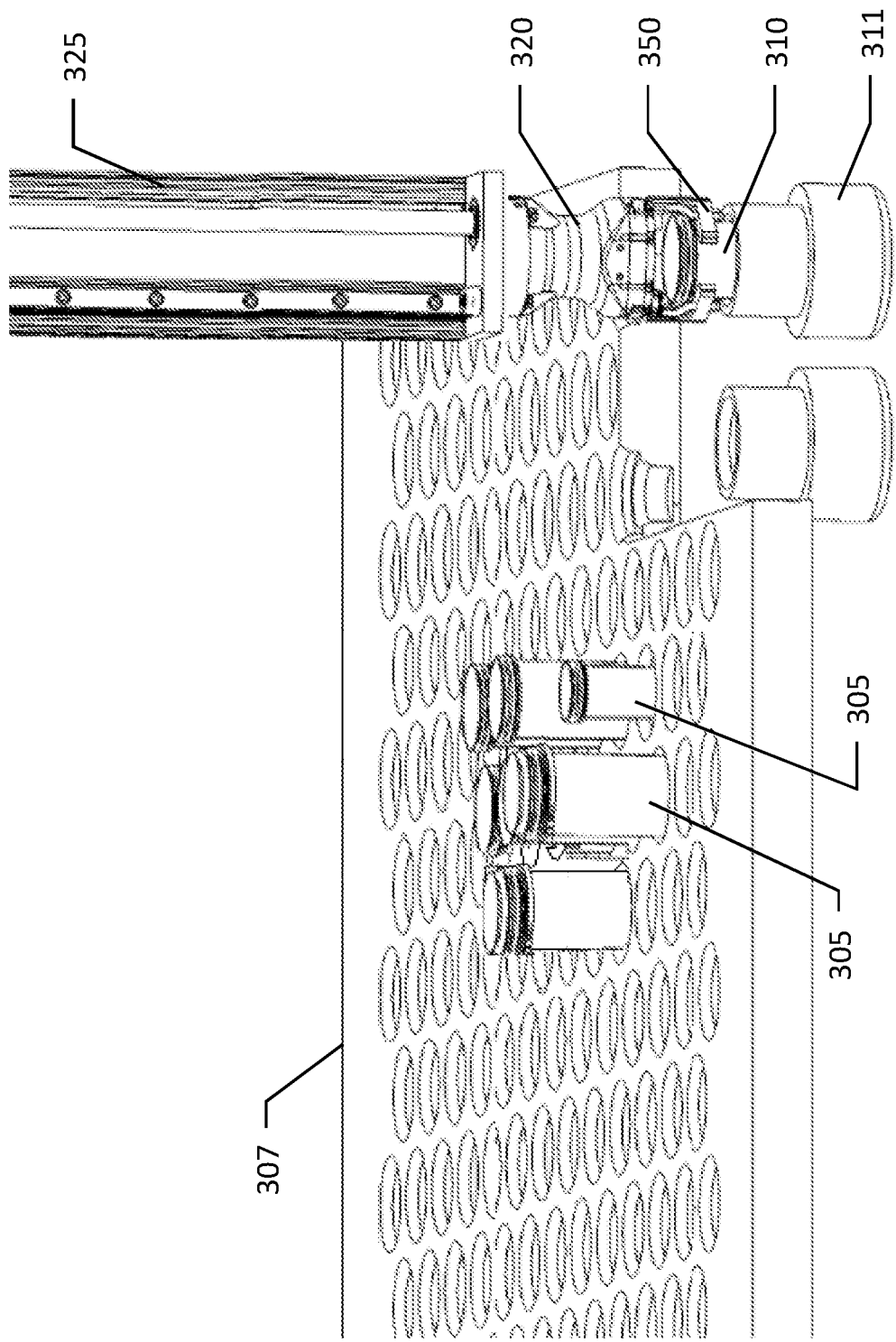
FIG. 12 illustrates an automated retrieval and dispensing system depositing a container to a puck according to an example embodiment of the present disclosure.

FIGS. 10 through 12 illustrate an example embodiment of transporting containers 310 within an automated dispensing system. Example embodiments may be directed to retrieve a container from a table 307 configured to hold a plurality of containers 305, transport the container from the retrieval location, and deposit the container within a uniform puck 311 for further processing. As shown in FIG. 10, the grasping head 320 is moved by the robotic arm 325 toward the container 310 to be retrieved. The container may be identified by a controller 125 in response to a request received, such as via the communication interface 220 or the user interface 205, for a particular product. The request may include a particular product type and quantity, where the controller may identify a container corresponding to the requested product type and quantity. The controller may also have, for example stored in memory device 215, an indication of the containers in the various locations of the table 307. Thus, in response to a received request, the controller 125 may use the requested product type and requested quantity to identify a location on the able 307 containing a container corresponding to the request. The controller may identify a container size that is to be retrieved in addition to the location.

As shown in FIG. 10, the robot arm 325 may advance to the position identified by the controller 125 and advance the grasping head 320 toward the container 310 to be retrieved. The grasping members 350 may be in the open position before the grasping head 320 is advanced toward the container 310. Upon the grasping members being positioned above and adjacent to the selected container 310, the controller may cause the grasping members 350 to advance to an engaged position to engage the selected container. The controller 125 may anticipate an expected container size at the selected location based on the container stored at that location as correlated in memory device 215. While a size of the container may be known or expected, the movement of the grasping members from the open position to the engaged position may not be based on the expected container size, but may instead be based on force-feedback received from the grasping members 350. Thus, as the grasping members close in on the selected container 310, the grasping members may stop movement and be in the engaged position responsive to experiencing force feedback of a first force that satisfies a predetermined value. The predetermined value may be set high enough that friction within the grasping head 320 does not satisfy the predetermined value, but not so high as the grasping members 350 pinch or deform the container during engagement. The controller 125 may control this force-feedback loop by receiving the force exerted on the grasping members 350 during the closing motion from the open position to the engaged position, and the controller may thus stop the further closure of the grasping members based on the force feedback received.

While the controller 125 anticipates a container of a predetermined size, in some instances, the container 310 engaged by the grasping members 350 may not correspond to the predetermined size. This may be due to improper user intervention, or improper correlation of a particular container with a location on the table 307. The controller may identify the improper size container based on a distance of travel measured between the grasping members 350. For example, if the grasping members are anticipated to be moved to be 1-inch apart in the engaged position, and the grasping members stop in an engaged position based on force feedback at a distance of 1.5-inches apart, the controller may recognize this issue and alert an operator of the system to the issue.

Referring again to FIG. 11, the robot arm 325 may move the grasping head 320 vertically and consequently the grasping members 350 and the selected container 310 to lift the selected vile from the table. The robot arm 325 may then transport the selected container 310 from the original location. FIG. 12 illustrates that the robot arm 325 has moved the grasping head 320 and grasping members 350 holding the container 310 to place the container into the container puck 311. The container puck 311 may then be used for transporting the container for further processing.

Figure 13:
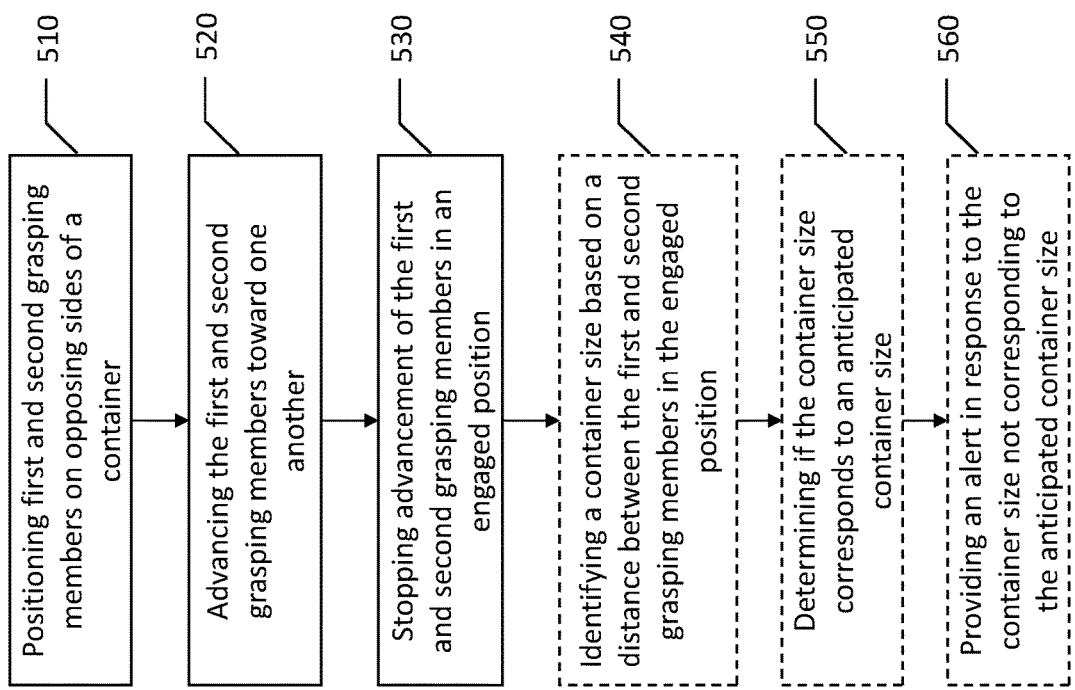
FIG. 13 is a flowchart of a method for grasping a container in an automated retrieval and dispensing system according to an example embodiment of the present disclosure.

FIG. 13 is a flowchart of a method for retrieving and dispensing a container according to an example embodiment of the present disclosure. It will be understood that each block of the flowchart and combinations of blocks in the flowchart may be implemented by various means, such as hardware, firmware, processor, circuitry, and/or other devices associated with execution of software including one or more computer program instructions. These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the disclosure, as shown in FIG. 13, may include positioning first and second grasping members on opposing sides of a container. The first and second grasping members may each include a post member and first and second grasping fingers, where the first and second grasping fingers extend in a V-shape from the respective post member. At 520, the first and second grasping members may be advanced toward one another, capturing the container between the first and second grasping fingers of each of the first and second grasping members. Advancement of the first and second members is stopped at 530 in an engaged position in response to a force exerted by the container on the first and second grasping members satisfying a predetermined value.

FIG. 13 also depicts optional elements of the method shown in broken lines. As shown at 540, a container size is identified based on a distance between the first and second grasping members in the engaged position. This may be performed, for example, by controller 125. At 550, it is determined, such as by controller 125, if the container size corresponds to an anticipated container size. An alert is provided at 560 in response to the container size not corresponding to an anticipated container size.

Moreover, in some embodiments additional operations may also be included. It should be appreciated that each of the modifications, optional additions, or amplifications may be included with the operations above either alone or in combination with any others among the features described herein.

In an example embodiment, an apparatus for performing the method of FIG. 13 may include a processor, such as processor 200 of controller 125, configured to perform some or all of the operations (510-560) described above. The processor may, for example, be configured to perform the operations (510-560) by performing hardware implemented logical functions executing stored instructions, or executing algorithms for performing each of the operations. Alternatively, the apparatus may include means for performing each of the operations described above.

An example of an apparatus according to an example embodiment may include at least one processor and at least one memory including computer program code. The at least one memory and the computer program code may be configured to, with the at least one processor, cause the apparatus to perform the operations 510-560.

An example of a computer program product according to an example embodiment may include at least one computer-readable storage medium having computer-executable program code portions stored therein. The computer-executable program code portions may include program code instructions for performing operations 510-560.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system comprising:
   a grasping head;
   first and second grasping members, each comprising:
      a top member;
      a post member extending from the top member; and
      first and second grasping fingers, wherein the first and second grasping fingers extend from the post member;
      wherein at least one of the first and second grasping members is movably connected to the grasping head.

2. The system of claim 1, wherein the first and second grasping fingers are spaced apart from the top member by a predetermined distance.

3. The system of claim 1, further comprising a controller, wherein the controller is configured to identify a location of a container to be retrieved by the grasping head and advance the grasping head to the location to retrieve the container.

4. The system of claim 1, wherein the first and second grasping members are configured to receive between the first and second grasping fingers, a container, wherein the container is not grasped by the first and second grasping members when the at least one of the first and second grasping members is moved relative to the other of the first and second grasping members to an open position, and wherein the container is grasped by the first and second grasping members when the at least one of the first and second grasping members is moved relative to the other of the first and second grasping members to a closed position.

5. The system of claim 4, wherein the container comprises a cap to be received within a predetermined distance between the first and second grasping fingers and the top member of each grasping member, and wherein the predetermined distance is based on a size of the cap.

6. The system of claim 1, further comprising a controller, wherein the controller controls movement of the at least one of the first and second grasping members relative to the other of the first and second grasping members, wherein the first and second grasping members are configured to be moved between an open position and a closed, engaged, position, wherein in the engaged position the first and second grasping members are configured to secure a container therebetween.

7. The system of claim 6, wherein force feedback is received at the controller from the at least one of the first and second grasping members, wherein in response to the at least one of the first and second grasping members moving from the open position to the closed, engaged position, the at least one of the first and second grasping members is stopped in response to receiving a force satisfying a predetermined value.

8. A method comprising:
   positioning first and second grasping members on opposing sides of a container, wherein the first and second grasping members each comprises a post member and first and second grasping fingers;
   advancing the first and second grasping members toward one another, capturing the container between the first and second grasping fingers of each of the first and second grasping members; and
   stopping advancement of the first and second grasping members in an engaged position.

9. The method of claim 8, further comprising:
   identifying a container size based on a distance between the first and second grasping members in the engaged position;
   determining if the container size corresponds to an anticipated container size; and
   providing an alert in response to the container size not corresponding to the anticipated container size.

10. The method of claim 8, wherein stopping the advancement of the first and second grasping fingers in the engaged position is in response to a force exerted by the container on the first and second grasping members satisfying a predetermined value.

11. The method of claim 8, wherein the first and second grasping fingers of each of the first and second grasping members extend from the respective post member at an angle of between about 80 degrees and 120 degrees or at an angle of between about 95 degrees and 105 degrees.

12. The method of claim 8, further comprising:
identifying a location of the container at a controller in response to a request; and
advancing a grasping head comprising the first and second grasping members to the location of the container.

13. The method of claim 12, wherein advancing the grasping head to the location of the container is performed by a robotic arm.

14. The method of claim 12, wherein advancing the first and second grasping members toward one another is performed by the grasping head.

15. The method of claim 14, wherein advancing the first and second grasping members toward one another is performed by a linear actuator of the grasping head.

16. The method of claim 12, further comprising:
retrieving the container from the location of the container;
advancing the container to a second location; and
releasing the container at the second location.

17. The method of claim 16, wherein releasing the container at the second location comprises advancing the first and second grasping members away from one another.

18. A grasping member comprising:

first and second grasping fingers;

a top member; and a post element extending between the first and second grasping fingers and the top member, wherein the first and second grasping fingers extend from the post member an angle of between about 80 degrees and 120 degrees relative to one another.

19. The grasping member of claim 18, wherein the top member is spaced from the first and second grasping fingers by a predetermined distance, and wherein the predetermined distance is based on a height dimension of a cap of a container to be grasped by the grasping member.

20. The grasping member of claim 18, wherein a radius is defined between the first and second grasping fingers having a radius dimension of between about a quarter-of-an-inch and three-quarters-of-an-inch.

\* \* \* \* \*